United States Patent [19]

Kitaura et al.

[11] Patent Number: 5,087,985
[45] Date of Patent: Feb. 11, 1992

[54] POLARIZER FOR VISIBLE LIGHT

[75] Inventors: Koichi Kitaura; Shoji Kigoshi, both of Otsu; Hisao Hisaki, Echi, all of Japan

[73] Assignee: Toray Industries, Inc., Tokyo, Japan

[21] Appl. No.: 465,196

[22] PCT Filed: Jul. 12, 1989

[86] PCT No.: PCT/JP89/00700
§ 371 Date: Feb. 13, 1990
§ 102(e) Date: Feb. 13, 1990

[87] PCT Pub. No.: WO90/00750
PCT Pub. Date: Jan. 25, 1990

[30] Foreign Application Priority Data

Jul. 12, 1988 [JP] Japan ................. 63-174227

[51] Int. Cl.$^5$ ................................. G02B 5/22
[52] U.S. Cl. ..................... 359/350; 359/490; 252/588
[58] Field of Search ............ 350/1.1, 397, 398, 370; 252/582, 588, 589

[56] References Cited

U.S. PATENT DOCUMENTS

| | | | |
|---|---|---|---|
| 3,780,307 | 12/1973 | Saeva et al. | 380/398 |
| 3,806,462 | 4/1974 | Bloom | 380/398 |
| 4,427,741 | 1/1984 | Aizawa et al. | 428/332 |
| 4,803,014 | 2/1989 | Okumura et al. | 380/397 |
| 4,859,039 | 8/1989 | Okumura et al. | 350/398 |

FOREIGN PATENT DOCUMENTS

| | | |
|---|---|---|
| 0297927 | 1/1989 | European Pat. Off. |
| 123944 | 10/1978 | Japan . |
| 7735 | 1/1980 | Japan . |
| 100510 | 7/1980 | Japan . |
| 33612 | 4/1981 | Japan . |
| 48601 | 5/1981 | Japan . |
| 5121 | 8/1982 | Japan . |
| 61-5204 | 1/1986 | Japan ............ 350/397 |
| 85203 | 4/1987 | Japan . |

Primary Examiner—Bruce Y. Arnold
Assistant Examiner—Hung Xuan Dang
Attorney, Agent, or Firm—Scully, Scott, Murphy & Presser

[57] ABSTRACT

The present invention concerns a polarizer for visible light, comprising a polyvinyl alcohol-based polarizing element wherein not less than 60% of dichromophore is iodine, and a protective film. The said polarizing element has at least three absorption bands in an ultraviolet region of 210 nm to 400 nm and also has a UA value of not smaller than 4.0 which value represents ultraviolet absorption characteristics. Consequently, the polarizer of the invention possesses both superior polarization characteristics and high heat and humidity resistance. The polarizer of the invention having these characteristics is used for liquid crystal display and is suitable particularly for such uses as display in watches and electronic calculators, terminal dispaly in personal computers and word processor, picture display in portable television sets, and display in automobiles and aircraft.

7 Claims, 3 Drawing Sheets

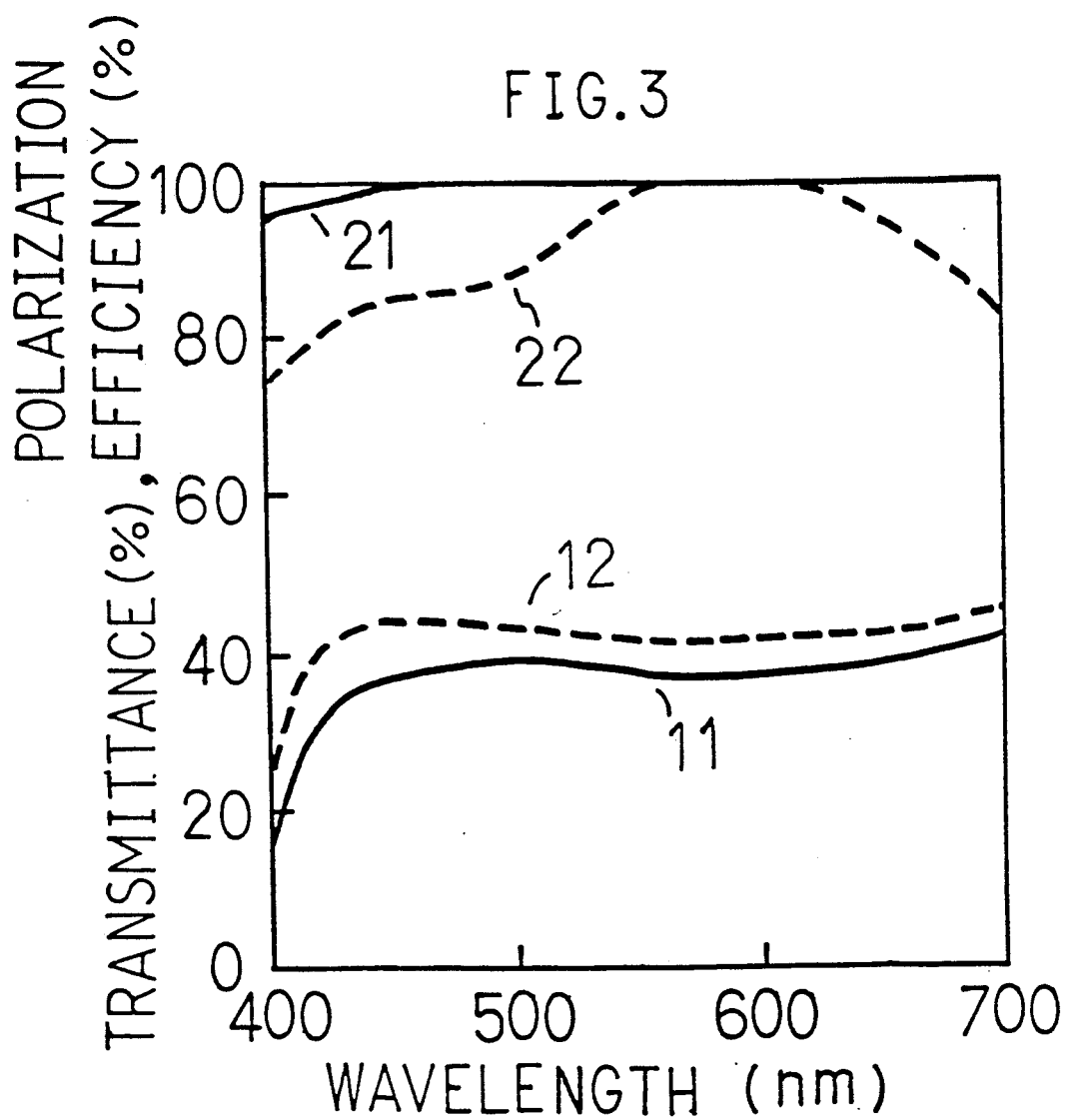

POLARIZER FOR VISIBLE LIGHT

FIELD OF ART

The present invention relates to a polarizer superior in both heat and humidity resistance and polarization characteristics.

BACKGROUND ART

Heretofore, as methods for improving the heat and humidity resistance of a polarizer there have been known a method using dichroic dyes or polyenes as dichromophores (e.g. Japanese Patent Publication No. 5121/1986 and Patent Laid-Open no. 123944/1978) and a method wherein the surface of a dichromophore is coated with a hydrophobic resin (e.g. Japanese Patent Laid-Open No. 33612/1981 and 62011/1982).

Liquid crystal displays of TN and STN types utilizing polarizers have been used as display portions of watches and electronic calculators, and according to the recent tendency, liquid crystal displays are being applied to various uses such as, for examples, terminal displays of personal computers and word processors, displays mounted in automobiles and aircraft. The development of a polarizer superior in heat and humidity resistance and polarization characteristics is absolutely necessary for the attainment of high reliability and high picture quality of these display devices.

However, the foregoing conventional polarizers using dichroic dyes or polyenes are poor in polarization characteristics although they exhibit high heat and humidity resistance. Polarizers wherein the surface of dichromophore is coated with a hydrophobic resin such as polyurethane, polyether sulfone, polyester, or polyamide, are poor in the adhesion to polyvinyl alcohol-based polarizing elements and incapable of being rendered completely heat- and humidity-proof. Besides, interference color is easily developed due to birefringence of the hydrophobic resin layer, and curling is apt to occur due to contraction and expansion of the polarizing element and the resin layer. Thus, a limit has heretofore been encountered in the improvement of heat and humidity resistance and polarization characteristics.

DISCLOSURE OF THE INVENTION

It is the object of the present invention to remedy the above-mentioned problems and provide a novel polarizer superior in both heat and humidity resistance and polarization characteristics.

More specifically, the present invention is concerned with a polarizer for visible light comprising a polyvinyl alcohol-based polarizing element wherein 60% or more of dichromophore is iodine and a protective film, the said polarizing element having three absorption bands in an ultraviolet region of 210 to 400 nm and having a UA value of not less than 4.0 which value represents ultraviolet absorption characteristics.

According to the construction of the present invention there can be obtained a polarizer for visible light superior in both polarization characteristics and heat and humidity resistance. Since this polarizer is also superior in flatness, it permits the improvement in reliability and picture quality of a liquid crystal display.

BRIEF DESCRIPTION OF THE DRAWINGS

FIG. 3 is a view showing transmittance spectra of visible light and polarization efficiency spectra before and after the conventional polarizer is allowed to stand in a wet heat atmosphere, in which the reference numerals 11 and 21 represent a transmittance spectrum and a polarization spectrum, respectively, in the initial stage and the numerals 12 and 22 represent a transmittance spectrum and a polarization spectrum, respectively, after standing in a wet heat atmosphere.

BEST MODE FOR PRACTISING THE INVENTION

Figure 1:
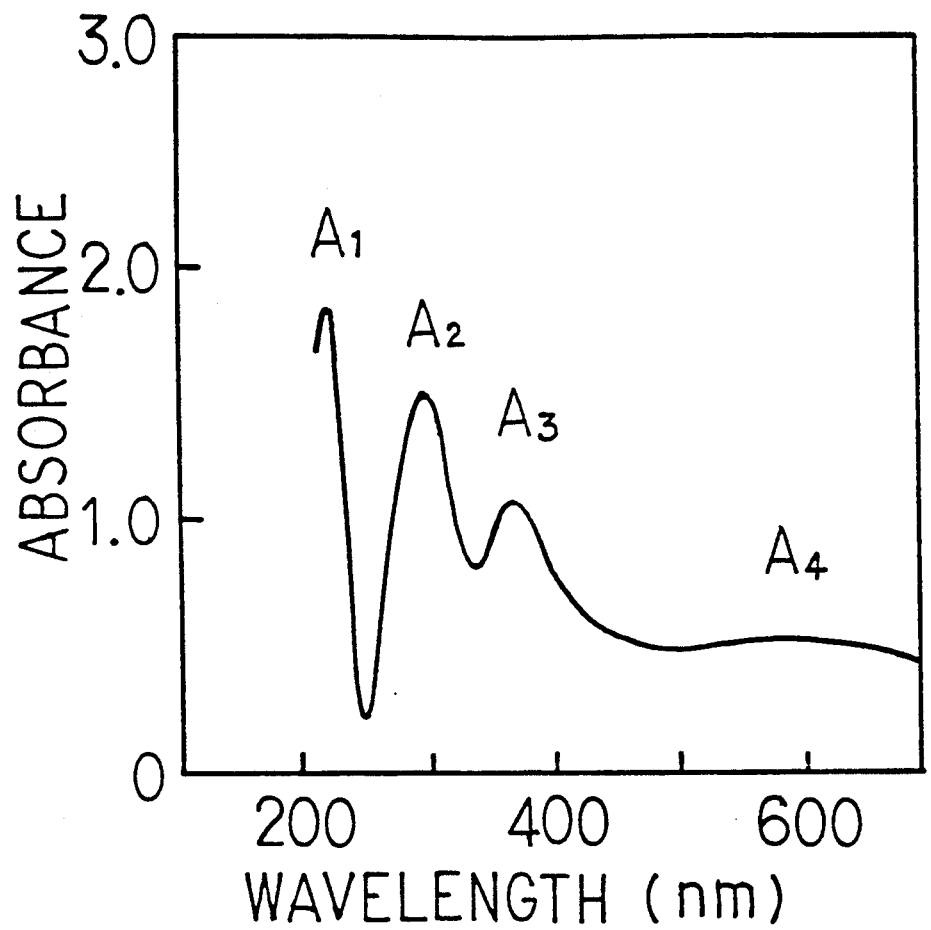
FIG. 1 is a view showing an absorption spectrum in the ultraviolet and visible wavelength region of the polarizer of the present invention.

The "polyvinyl alcohol-based polarizing element" as referred to herein indicates a film as a base formed of polyvinyl alcohol, polyvinyl formal, polyvinyl butyral, polyvinyl acetal, or a ethylene-vinyl acetate copolymer, and iodine adsorbed and oriented in the film. From the standpoint of stretching and dyeing properties it is preferable that the saponification degree the polyvinyl alcohol-based film be not lower than 85 mole %, more preferably 90 to 100 mole %. Its thickness is in the range preferably 1 to 50 $\mu$m, more preferably 5 to 30 $\mu$m. For attaining a high picture quality in liquid crystal display it is necessary that 60% or more, preferably 70% to 100%, of dichromophore be iodine. If the iodine content is less than 60%, the polarization characteristics will be deteriorated, resulting in deterioration of the contrast of pixels. As a dichromophore other than iodine there may be contained a dichroic dye or a polyene within the range of the balance.

As the polyvinyl alcohol-based polarizing element used in the present invention a uniaxially stretched film is preferred from the standpoint of polarization characteristics.

As to the protective film, from the standpoint of transparency and adhesion, cellulose acetate films such as cellulose triacetate and cellulose diacetate films, cellulose acetate butyrate film and cellulose nitrate film are preferred examples. Particularly, cellulose acetate films having a thickness of 25–200 $\mu$m are desirable because they are superior in dimensional stability in moisture absorption and strength characteristics. For the purpose of improving the resistance to light of the protective film there may be incorporated therein an ultraviolet absorber such as a benzophenone or benzotriazole absorber. A preferred amount of the ultraviolet absorber is in the range of 0.5 to 5 wt %. In both of the polyvinyl alcohol-based film and the protective film there may be incorporated a plasticizer such as, for example, a phosphate, glycol or phthalate plasticizer for the purpose of improving their plasticity. A preferred amount of the plasticizer is in the range of 10 to 30 wt %. Further, for improving slipperiness there may be added inorganic particles such as, for example, particles of silica, calcium carbonate, calcium silicate, or kaolinite. The said inorganic particles are preferably in the range of 0.1 to 5 $\mu$m in diameter and are used in an amount of preferably 0.005 to 0.1 wt %.

It is necessary that the polarizing element used in the present invention have at least three absorption bands in an ultraviolet region of 210 to 400 nm and have a UA value (parameter of ultraviolet absorption characteristics) of not smaller than 4.0 which value represents ultraviolet absorption characteristics. The UA value is a heat and humidity resistance characteristic value which is given by the following equation (I) from the absorption spectrum in the ultraviolet and visible wavelength region of the polarizing element, and particularly preferably it is in the range of 5.0 to 50:

$$UA = \{A_1 + 0.5(A_2 + A_3)\}/A_4 \quad \ldots \quad (I)$$

where, $A_1$: absorbance of a maximum absorption band in an ultraviolet region of not smaller than 210 nm and smaller than 250 nm in wave length $A_2$: absorbance of a maximum absorption band in an ultraviolet region of not smaller than 250 nm and smaller than 330 nm in wave length $A_3$: absorbance of a maximum absorption band in an ultraviolet region of not smaller than 330 nm and not larger than 400 nm in wave length $A_4$: absorbance at the wave length of 550 nm If the UA value in the equation (I) is smaller than 4.0, the heat and humidity resistance of the polarizer will be poor, and when the polarizer is assembled in a liquid crystal display and used in an atmosphere of high humidity and high temperature, the polarization efficiency of the polarizer will be deteriorated markedly, resulting in that the contrast of the picture obtained is poor. For obtaining a polarizing element of a neutral gray color it is preferable that the UA value be not larger than 50.

On the other hand, the polarizing element used in the present invention is preferably in the range of 25% to 50%, more preferably 30% to 45%, in terms of an average transmittance of visible light (hereinafter referred to as "VT value") after correction of spectral luminous efficiency in the wave length range from 400 nm up to 700 nm. If the VT value is low, the liquid crystal display will become dark, while if it is too high, the polarizing element may be inferior in both heat and humidity resistance and polarization characteristics.

Figure 2:
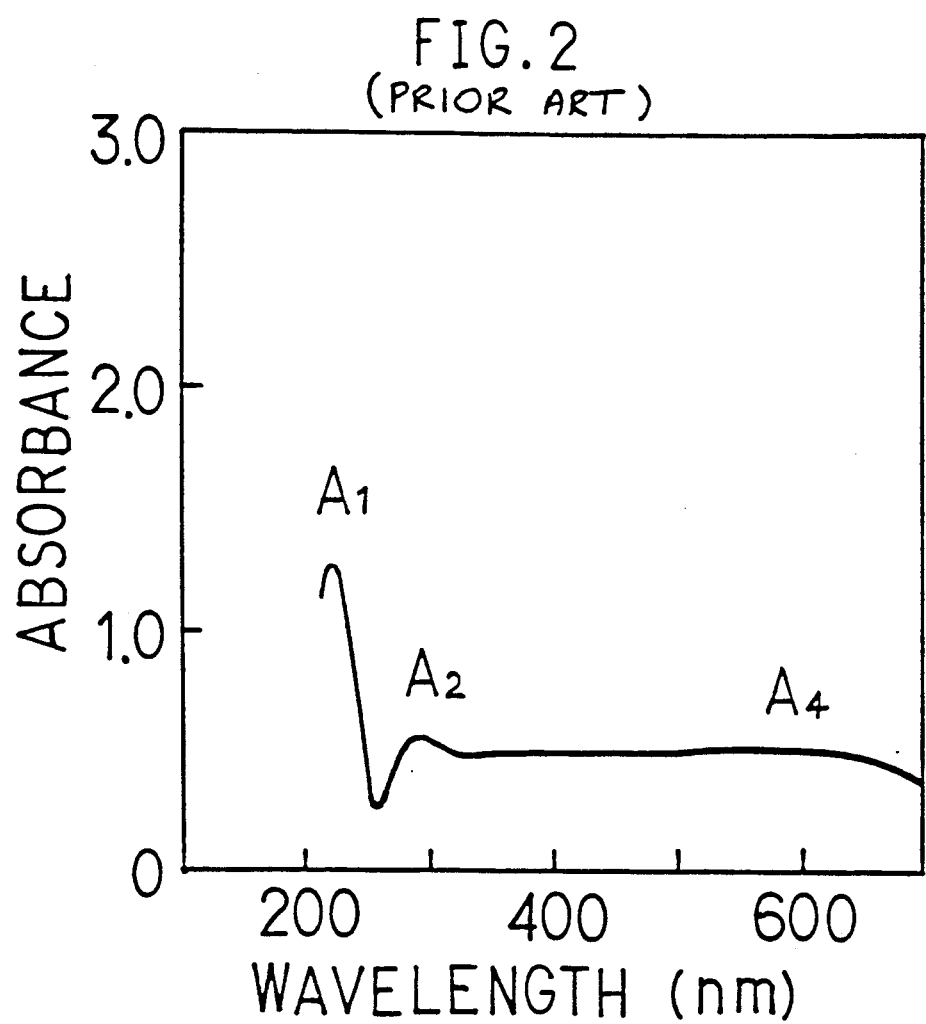
FIG. 2 is a view showing an absorption spectrum in the ultraviolet and visible wavelength region of a polarizing element in a conventional polyvinyl alcohol/iodine polarizer.

The polarizer of the present invention will be described below with reference to the drawings From the comparison between FIGS. 1 and 2 it is apparent that in the polarizing element of the polarizer of the present invention the maximum absorbance is increased remarkable at wave lengths of 213 nm, 294 nm and 363 nm of a conventional polarizing element.

It has heretofore been considered that the absorption characteristics in the ultraviolet wavelength region of not larger than 400 exert no influence on the polarization characteristics and heat and humidity resistance in the visible wavelength region of 400 to 700 nm. But as a result of extensive studies about the ultraviolet absorption characteristics of a polarizing element as well as the polarization characteristics and heat and humidity resistance thereof, the present inventors reached the present invention.

More specifically, as is seen from FIG. 3, a polyvinyl alcohol/iodine polarizer lowers markedly in its polarization efficiency in the wavelength region of 400 to 500 nm in a wet heat atmosphere, resulting in deterioration of its polarization characteristics of visible light. The polarizing element in the polyvinyl alcohol/iodine system comprises polyiodines arranged in an orientated direction of the polyvinyl alcohol. It is presumed to be polyiodines $I_4^-$ and $I_4^-$ that absorb wave lengths of 400 to 500 nm which are apt to be influenced by heat and humidity. The polyiodines $I_4^-$ and $I_5^-$ do not sublimate in a wet heat atmosphere not higher than 100° C., in which there occurs cutting of polyiodines and a change is made into $I^- \sim I_3^-$ which exhibit absorption only in the ultraviolet wavelength region, so that the polarization efficiency is deteriorated and decoloration is made into blue color. In a wet heat atmosphere, polyiodines gradually change into polyiodines of lower order under repetition in a reversionary manner like $I_5^- \rightarrow I_4^{31} \rightarrow I_5^{31} \rightarrow I_4^- \rightarrow I_3^-$. Therefore, the cutting of the polyiodines $I_4^-$ and $I_5^-$ can be delayed equilibrium-reactionwise by forming in the polarizing element a large amount of the polyiodines $I^{31} \sim I_3^-$ which exhibit absorption only in the ultraviolet wavelength region. As a result, the heat and humidity resistance of the polarizer is improved.

Stable polyiodines which exhibit absorption in the ultraviolet wavelength region are $I_3^-$ exhibiting maximum absorbances near 363 nm and 294 nm and $I^-$ exhibiting a maximum absorbance near 213 nm.

The polarizer of the present invention can be produced, for example, by the following method. But it is to be understood that how to produce the polarizer of the invention is not limited to this method. An unstretched polyvinyl alcohol film 50 μm thick is uniaxially stretched to 4~6 times its original length in the longitudinal direction at a temperature of 80°-150° C., then dipped in an aqueous iodine solution containing potassium iodide at a high concentration of 10-40 wt % and subsequently treated in an aqueous boric acid and borax solution containing potassium iodide at a high concentration of 10-40 wt % to form polyiodines which exhibit absorption in the ultraviolet and visible wavelength region and have a particularly high $I_3^-$ to $I_5^-$ content. Next, the polyiodines $I_3^- \sim I_5^-$ are cut into polyiodines $I^- \sim I_3^-$ of a lower order by the irradiation of ultraviolet light at a rate of 5 to 50 mj/cm² using a mercury vapor lamp. Further, the film is dipped in a 5-30 wt % aqueous solution of potassium iodide and then heat-treated at a temperature of 100°-200° C., allowing thermal decomposition to be accelerated by the potassium iodide to change the polyiodines $I_5^- \sim I_7^-$ into $I_3^-$ of a lower order. Then, a protective film is formed on one or both sides of the resulting polarizing element to obtain the polarizer for visible light of the present invention.

The following are how to determine characteristic values and how to evaluate effects in the present invention.

(1) Absorbance

The absorbance of a polarizing element alone in the wavelength region of 200 to 700 nm was determined in a continuous manner at a wavelength scanning speed of 300 nm/min using a spectrophotometer (U-3400, a product of Hitachi, Ltd.).

(2) Average Visible Light Transmittance (VT value)

A spectral transmittance was determined at intervals of 10 nm in the wavelength region of 400 to 700 nm in accordance with EIAJ (standards of Electronic Industries Association of Japan) LD-201, and VT value was calculated by the following equation (II):

$$VT(\%) = \frac{\int_{400}^{700} P_\lambda \cdot Y_\lambda \cdot \tau_\lambda \, d\lambda}{\int_{400}^{700} P_\lambda \cdot Y_\lambda \, d\lambda} \times 100 \qquad (II)$$

where,
 $P_\lambda$: spectral distribution of $D_{65}$ light source
 $Y_\lambda$: color matching functions of CIE 1931 standard colorimetric system
 $\tau_\lambda$: spectral transmittance distribution

(3) Polarization Efficiency

If an average visible light transmittance in a combination of two polarizers disposed in parallel with each in the respective absorption axis directions is VT and that in a combination of two polarizers intersecting each other perpendicularly is VT', the polarization efficiency, PE, is calculated by the following equation (III):

$$PE(\%) = \sqrt{(VT - VT')/(VT + VT')} \times 100 \qquad (III)$$

(4) Heat and Humidity Resistance

After a polarizer is placed in a 60° C., 90% atmosphere for 300 hours, the average visible light transmittance, VT, and the polarization efficiency, PE, are determined, then there are determined differences thereof from the respective initial values, which differences are indicated as a change in transmittance ($\Delta VT$) and a change in polarization efficiency ($\Delta PE$), respectively. As a matter of course, the smaller these changes, the higher the heat and humidity resistance of the polarizer.

EXAMPLES

The present invention will be described below in more detail in terms of the following examples.

EXAMPLE 1

An unstretched polyvinyl alcohol film 50 μm thick was uniaxially stretched to 4.8 times its original length in the longitudinal direction at a temperature of 130° C., then dipped in an aqueous solution containing 0.3 wt % iodine and 20 wt % potassium iodide at 35° C. for 15 seconds, and subsequently dipped in an aqueous solution containing 15 wt % boric acid and 5 wt % borax at 65° C. for 60 seconds, followed by drying at 70° C. for 60 seconds to obtain a film containing polyiodines formed. Then, ultraviolet light was radiated to this film at a rate of 10 mj/cm² by means of a mercury vapor lamp to cut polyiodines into a lower order. Further, the film was dipped in a 20 wt % aqueous potassium iodide solution and then heat-treated at 180° C. for 30 seconds to obtain a polarizer having three absorption bands in the ultraviolet region of 210 to 400 nm and having a parameter of ultraviolet absorption characteristics (UA value) of 5.2. An 80 μm thick cellulose triacetate film was laminated to both sides of the polarizer, using a polyvinyl alcohol adhesive, to obtain a polarizer for visible light having an average visible light transmittance (VT value) of 42.5%.

EXAMPLE 2

A polarizer for visible light having three absorption bands in the ultraviolet region of 210 nm to 400 nm and having a parameter (UA value) of ultraviolet absorption characteristics of a polarizing element of 10.1 and an average visible light transmittance (VT value) of 41.7% was produced under the same conditions as in Example 1 except that the uniaxially stretched film was dipped in an aqueous solution containing 10 wt % boric acid and 20 wt % potassium iodide in place of the aqueous solution containing 15 wt % boric acid and 5 wt % borax used in Example 1.

EXAMPLE 3

A polarizer for visible light having not less than three absorption bands in the ultraviolet region of 210 nm to 400 nm and having a parameter (UA value) of ultraviolet absorption characteristics of a polarizing element of 7.7 and an average visible light transmittance (VT value) of 42.3% was produced under the same conditions as in Example 1 except that after the uniaxial stretching of the polyvinyl alcohol film, the stretched film was dipped in an aqueous solution containing 0.5 wt % of Diacotton Sky Blue 6B (a product of Mitsubishi Chemical Industries Ltd.) at 35° C. for 2 minutes.

COMPARATIVE EXAMPLE 1

An unstretched polyvinyl alcohol film having a thickness of 50 μm was uniaxially stretched to 4.8 times its original length in the longitudinal direction at a temperature of 130° C. Thereafter, the film thus stretched was dipped in an aqueous solution containing 0.3 wt % iodine and 2.5 wt % potassium iodide at 35° C. for 15 seconds and subsequently dipped in an aqueous solution containing 5% boric acid at 65° C. for 60 seconds, followed by drying at 70° C. for 60 seconds to obtain a polarizer having three absorption bands in the ultraviolet region of 210 to 400 nm and having parameter (UA value) of ultraviolet absorption characteristics of 3.7 Then, an 80 μm thick cellulose triacetate film was laminated to both sides of the polarizer using a polyvinyl alcohol adhesive to obtain a conventional polarizer for visible light having an average visible light transmittance (VT value) of 38.6%.

COMPARATIVE EXAMPLE 2

A polarizer for visible light having two absorption bands in the ultraviolet region of 210 nm to 400 nm and having a parameter (UA value) of ultraviolet absorption characteristics of a polarizing element of 4.3 and an average visible light transmittance (VT value) of 55.1% was produced under the same conditions as in Example 1 except that the uniaxially stretched film was dipped in an aqueous solution containing 0.1 wt % iodine and 25 wt % potassium iodide in place of the aqueous solution containing 0.3 wt % iodine and 20 wt % potassium iodide

COMPARATIVE EXAMPLE 3

A polarizer for visible light having three absorption bands in the ultraviolet region of 210 nm to 400 nm and having a parameter (UA value) of ultraviolet absorption characteristics of a polarizing element of 6.9 and an average visible light transmittance (VT value) of 43.4% was produced under the same conditions as in Example 1 except that after the uniaxial stretching of the polyvinyl alcohol film, the stretched film was dipped in an aqueous solution containing 0.8 wt % of Diacotton Sky Blue 6B (a product of Mitsubishi Chemical Industries ltd.) and 1.0 wt % of Kayarus Supra Orange 2GL (a product of Nippon Kayaku Co., Ltd.) at 35° C. for 2 minutes and then dipped in an aqueous solution containing 0.3 wt % iodine and 20 wt % potassium iodide at 35° C. for 7 seconds.

The polarizers for visible light produced in the above working and comparative examples were evaluated for polarization efficiency and heat and humidity resistance. The results are as shown in Table 1, from which it is seen that the polarizers according to the present invention are superior in both polarization efficiency and heat and humidity resistance.

TABLE 1

| Run No. | Dichromophore (%) | | Ultraviolet Absorption Characteristics | | Average Visible Light transmittance (%) | Polarization Efficiency (%) | Heat and Humidity Resistance | |
|---|---|---|---|---|---|---|---|---|
| | | | Number of Absorption Bands (pc.) | UA Value (—) | | | ΔVT (%) | ΔPE (%) |
| Ex. 1 | Iodine | 100 | 3 | 5.2 | 42.5 | 98.3 | 3.5 | 11.9 |
| Ex. 2 | Iodine | 100 | 3 | 10.1 | 41.7 | 98.5 | 1.8 | 0 |
| Ex. 3 | Iodine | 70 | 3 or more | 7.7 | 42.3 | 95.6 | 2.5 | 5.4 |
| | Dichroic Dye | 30 | | | | | | |
| Comp. Ex. 1 | Iodine | 100 | 3 | 3.7 | 38.6 | 98.9 | 27.0 | 66.3 |
| Comp. Ex. 2 | Iodine | 100 | 2 | 4.3 | 55.0 | 64.8 | 48.2 | 61.5 |
| | Iodine | 50 | 3 or more | 6.9 | 43.4 | 88.3 | 2.0 | 6.4 |
| | Dichroic Dye | 50 | | | | | | |

INDUSTRIAL APPLICABILITY

The polarizer of the present invention is used for liquid crystal display and is suitable particularly for such uses as display in watches and electronic calculators, terminal display in personal computers and word processors, picture display in portable television sets, and display in automobiles and aircraft.

We claim:

1. A polarizer for visible light comprising a laminate of a polarizing element and a protective film, said polarizing element being a polyvinyl alcohol film wherein at least 60% of the dichromophore absorbed thereon is iodine, said polarizing element characterized by three absorption bands in the ultraviolet region of 210 nm to 400 nm and a UA value of not less than 4.0 wherein said UA value represents ultraviolet absorption characteristics.

2. A polarizer for visible light as set forth in claim 1, wherein said polyvinyl alcohol film has a degree of saponification of at least 85 mole % and a thickness of 1 to 50 μm.

3. A polarizer for visible light as set forth in claim 1, wherein not less than 70% of the dichromophore is iodine.

4. A polarizer for visible light as set forth in claim 1, wherein the UA value is in the range of 5.0 to 50.

5. A polarizer for visible light as set forth in claim 1 or claim 2, wherein the protective film is a cellulose acetate film having a thickness of 25 to 200 μm.

6. A polarizer for visible light as set forth in claim 1, having an average visible light transmittance (VT value) of 25% to 50% after correction of spectral luminous efficiency in a wavelength region from 400 nm to 700 nm.

7. A polarizer for visible light as set forth in claim 6, wherein the average visible light transmittance is in the range of 30% to 45%.

* * * * *

UNITED STATES PATENT AND TRADEMARK OFFICE
CERTIFICATE OF CORRECTION

PATENT NO. : 5,087,985

DATED : February 11, 1992

INVENTOR(S) : Koichi Kitaura, et al.

It is certified that error appears in the above-identified patent and that said Letters Patent is hereby corrected as shown below:

Column 3, Line 68, "$I_4^-$ and $I_4^-$" should read as --$I_4^-$ and $I_5^-$--.

Column 4, Line 11, "$I_5^- \to I_4^{31} \to I_5^{31} \to I_4^- \to I_3^-$" should read as --$I_5^- \to I_4^- \to I_5^- \to I_4^- \to I_3^-$--.

Column 4, Line 15, "$I^{31} \sim I_3^-$" should read as --$I^- \sim I_3^-$--.

Column 5, Line 24,

" $PE (\%) = \sqrt{(VT - VT) / (VT + VT)} \times 100$ "

UNITED STATES PATENT AND TRADEMARK OFFICE
CERTIFICATE OF CORRECTION

PATENT NO. : 5,087,985
DATED : February 11, 1992
INVENTOR(S) : Koichi Kitaura, et al.

It is certified that error appears in the above-identified patent and that said Letters Patent is hereby corrected as shown below:

should read as $$-- \quad PE (\%) = \sqrt{(VT - VT') / (VT + VT')} \times 100 \quad --.$$

Signed and Sealed this

Seventeenth Day of August, 1993

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,087,985

DATED : February 11, 1992

INVENTOR(S) : Koichi Kitaura, et al.

It is certified that error appears in the above-identified patent and that said Letters Patent is hereby corrected as shown below:

Column 3, Line 68, "$I_4^-$ and $I_4^-$" should read as --$I_4^-$ and $I_5^-$--.

Column 4, Line 11, "$I_5^- \rightarrow I_4^{31} \rightarrow I_5^{31} \rightarrow I_4^- \rightarrow I_3^-$" should read as --$I_5^- \rightarrow I_4^- \rightarrow I_5^- \rightarrow I_4^- \rightarrow I_3^-$--.

Column 4, Line 15, "$I^{31} \sim I_3^-$" should read as --$I^- \sim I_3^-$--.

UNITED STATES PATENT AND TRADEMARK OFFICE
CERTIFICATE OF CORRECTION

PATENT NO. : 5,087,985
DATED : February 11, 1992
INVENTOR(S) : Koichi Kitaura, et al.

It is certified that error appears in the above-identified patent and that said Letters Patent is hereby corrected as shown below:

Column 5, line 24, $$\text{"} \quad PE (\%) = \sqrt{(VT - VT) / (VT + VT)} \times 100 \quad \text{"}$$

should read as $$-- \quad PE (\%) = \sqrt{(VT - VT') / (VT + VT')} \times 100 \quad --.$$

This certificate supersedes Certificate of Correction issued August 17, 1993.

Signed and Sealed this

Twelfth Day of October, 1993

Attest:

BRUCE LEHMAN

*Attesting Officer*  *Commissioner of Patents and Trademarks*